United States Patent [19]

Jacobson

[11] 4,220,425
[45] Sep. 2, 1980

[54] METHOD AND APPARATUS FOR ASSISTING PNEUMATIC CONVEYORS UTILIZING VACUUM

[75] Inventor: Wayne M. Jacobson, York, Nebr.

[73] Assignee: Cyclonaire Corporation, Henderson, Nebr.

[21] Appl. No.: 875,145

[22] Filed: Feb. 6, 1978

[51] Int. Cl.² .................................................. B65C 53/26
[52] U.S. Cl. .................................................. 406/86; 406/95
[58] Field of Search ....................... 302/21, 23, 24, 29, 302/58, 64; 406/86, 88, 89, 95

[56] References Cited

U.S. PATENT DOCUMENTS

| 3,253,865 | 5/1966 | Kanics | 302/29 |
| 3,372,958 | 3/1968 | Black | 302/53 |
| 3,758,163 | 9/1973 | Kalisiak | 302/58 |
| 4,019,641 | 4/1977 | Merz | 302/59 |

FOREIGN PATENT DOCUMENTS

| 1556045 | 1/1970 | Fed. Rep. of Germany | 302/29 |
| 1101052 | 1/1968 | United Kingdom | 302/64 |

Primary Examiner—Jeffrey V. Nase
Attorney, Agent, or Firm—Fitch, Even & Tabin

[57] ABSTRACT

Apparatus for assisting the pneumatic conveying of generally dry particulate matter through a closed conduit is disclosed. The apparatus is for use where vacuum pressure applied at one end of the conduit creates a suction force which moves the dry particulate matter through the conduit, and involves the use of a small tube or the like for injecting a gaseous fluid under positive pressure into the particulate matter to loosen it and enable it to be conveyed through the conduit.

8 Claims, 4 Drawing Figures

METHOD AND APPARATUS FOR ASSISTING PNEUMATIC CONVEYORS UTILIZING VACUUM

The present invention generally relates to pneumatic conveying systems, and, more particularly, to apparatus for loosening dry particulate matter that is contained in a pneumatic conveying conduit.

While pneumatic conveying systems have been known and used for decades, the continuing research and development of such systems has resulted in expanding uses, particularly in handling materials that had not previously been thought to be conducive to pneumatic conveying. Among the more significant developments in the pneumatic conveying of generally dry particulate matter is disclosed in the Black U.S. Pat. No. 3,372,958, which is also assigned to the same assignee as the present invention. The feeder apparatus disclosed therein can be used to unload and load bulk transports, rail cars, storage silos and the like and convey material at least about 500 feet. The feeder operates by alternately filling and emptying a closed vessel and uses a vacuum inside the vessel for creating a suction force for pulling the material into the vessel from a loading conduit that is connected to the rail car, silo or other supply source, and after the vessel becomes filled, it utilizes positive pressure to force the material through an outlet into a conveying line extending to a destination. The apparatus disclosed in the Black patent has many desirable features in that it creates a vacuum by venturi action rather than by using the negative side of a fan or blower and develops up to about 15 inches Hg vacuum when it is in the load cycle. This vacuum is used to suction unload from the material source such as rail cars or ground storage tanks or the like. By using the venturi action, neither high maintenance filters nor venting of the tank during gravity fill is needed and the apparatus has no rotating parts that come in contact with the material. The only moving parts which contact the material are a cone valve at the inlet and a flap valve at the outlet. The material being conveyed is less likely to be degraded in contrast with systems which have rotary air locks or compressive screw air conveyors and the like. The system is also advantageous in that it is relatively flexible and can be moved from one location to another for operation without significant down time or expense. It also requires no substantial permanent installation for unloading rail cars, such as deep pits beneath the railroad tracks or the like, since only a modest installation is needed which is about 2 feet below the elevation of the railroad tracks.

When the inlet to the feeder unit comes from unloading rail cars, the material is typically unloaded from the bottom of the rail cars and it must be conveyed upwardly into the inlet of the feeder unit which is located at its top.

Because the material is intermittently moved and stopped when the feeder unit has been filled, restarting the conveying of the dry particulate matter is often delayed, particularly with certain types of material, such as portland cement, for example. For this reason, the unit is typically placed as close to the rail as possible to minimize the length of inlet conduit from the pick-up point of the rail car to the unit. While the arrangement generally works satisfactorily, it should be appreciated that placement of the unit so near the rail cars may be inconvenient in certain applications and may also expose the unit to more hazardous conditions. Moreover, if a unit could be placed in a central location that is proximate to several pick-up points, then a flexible suction conduit that is movable could be extended to any one of the points for unloading cars and such flexibility of operation would offer distinct advantages.

Accordingly, it is an object of the present invention to provide apparatus for loosening dry particulate material in a vacuum pneumatic conveying conduit, which enables the material to flow more easily and thereby permits extended lengths of inlet conduit to be used.

A related object of the present invention is to provide relatively inexpensive apparatus that can be placed in vacuum driven pneumatic conveying conduits that will loosen the dry particulate matter therewithin and enable it to be moved over substantial distances.

A more detailed object of the present invention is to provide an aeration tubing means within a flexible vacuum driven pneumatic conveying conduit which will introduce gaseous fluid into the particulate matter being conveyed to thereby loosen the same so that it can flow, wherein said injection tubing has openings that are self-closing when they are not in use.

Other objects and advantages will become apparent upon reading the following detailed description, in conjunction with the attached drawings, in which.

Figure 1:
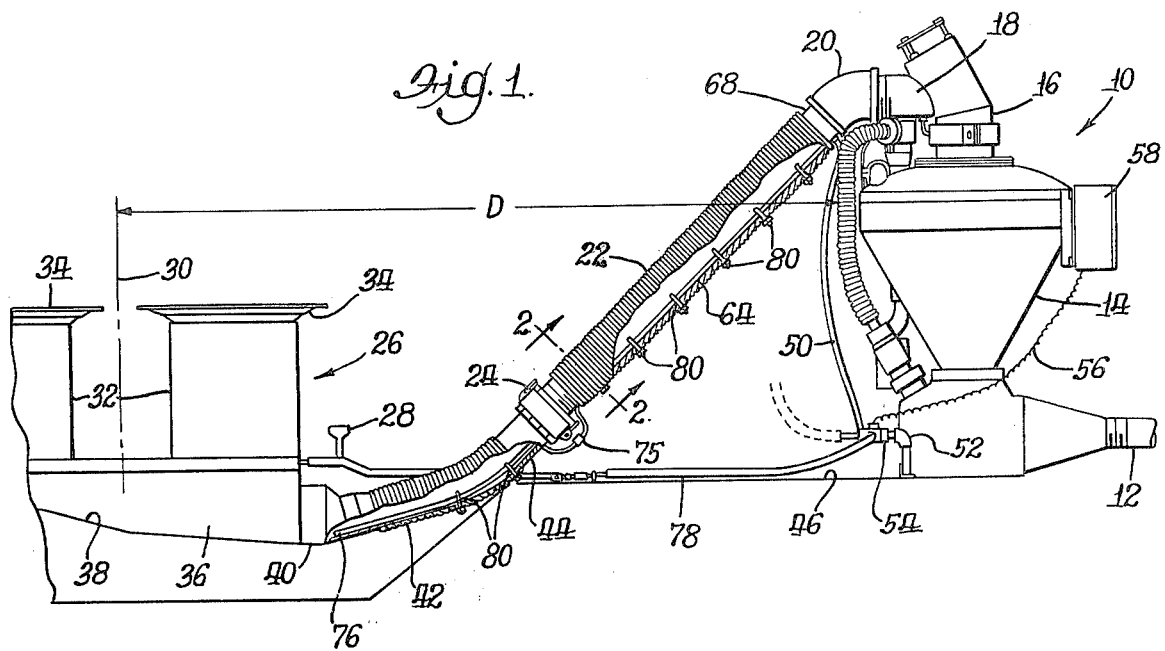
FIG. 1 is a side elevation of a pneumatic conveying feeding unit having a vacuum driven inlet conduit extending to a railroad car unloading hopper, and including an embodiment of the present invention.

Turning now to the drawing, and in particular, FIG. 1, there is shown an automatic feeder unit indicated generally at 10 for feeding a pneumatic conveying line 12 that extends from the lower portion of the unit to a destination which may be several hundred feet away from the feeder unit. The unit is similar in design and operation to that shown in the Black patent, U.S. Pat. No. 3,372,958 which is assigned to the same assignee as the present invention. The unit has a closed vessel 14 which is alternately filled and unfilled by the use of vacuum and positive pressure during alternate loading and unloading cycles. The material is loaded through the top portion of the unit, i.e., through conduit 16 which is shown to have a lateral connecting conduit 18 which is in turn connected to an elbow 20 that is connected to a flexible conduit 22 extending downwardly to a quick operating connector 24 that is connected to a railroad unloading apparatus, indicated generally at 26. The rail car unloading apparatus 26 is positioned between the rails, one of which is shown at 28 and is adapted to receive generally dry particulate matter from rail cars that are to be unloaded. The center line 30 between the rails is also located between two substantially similar boots 32 each of which have angled flanges 34 and the boots extend upwardly from a common pan 36 that has a sloped bottom wall 38 so that the material will tend to flow to the right into the transition piece 40 to a circular flexible conduit 42 that is connected to a short conduit 44 that terminates in the connector 24.

Thus, when the rail car is to be unloaded, the gates in the bottom of the rail car are opened when the rail car is properly positioned relative to the receiving boots 32 and flanges 34 and the entire rail car unload apparatus 26 at least generally below the ground elevation line 46 is completely filled or flooded with the particulate material.

During unloading of a rail car, the feeder unit 10 fills the vessel 14 by applying a vacuum on the interior of it with the outlet closed and the vacuum pulls the particulate matter from the rail car unloading apparatus 26 through the respective connectors, couplings and conduits 24, 22, 20, 18 and 16 (and interconnecting couplings) into the vessel by operation of a suction force created by the vacuum in the interior of the vessel 14. When the vessel becomes sufficiently full, an internal valve located near the conduit 16 closes and positive pressure is applied to the interior of the vessel which forces the material out through the bottom thereof and into the conduit 12 to its destination. When the vessel has been unloaded, then it changes its mode of operation and induces a vacuum in the vessel 14, opens the valve in conduit 16 and again fills the vessel. The sequencing occurs relatively rapidly, i.e., the loading and unloading cycle may occur every 20 seconds until the rail car is completely empty.

With the feeder unit 10 operating with pressure levels of about 15 p.s.i. positive pressure and generating a vacuum of about 7 p.s.i. through the use of the negative side of a venturi throat, the particulate material being unloaded will flow through the inlet conduits, including the conduit 22, even though the conduit 22 is on an upward incline as shown in FIG. 1. The distance from the center line of the railroad tracks to the edge of the feeder unit 10 is preferably maintained at a relative minimum, i.e., about 8 feet to minimize the problems of the particulate matter settling and plugging the conduit. This is often a problem when the particulate matter that is being unloaded comprises a powder, such as portland cement, ground lime, fly ash, flour, plastic resin, talc, soda ash, as well as many other materials that are conveyed using apparatus of the type used in FIG. 1. By minimizing the distance D, the tendency for clogging is reduced and the feeder unit most generally satisfactorily fills and unloads in the manner previously described.

However, it should be appreciated that the close distance of the unit to the tracks may be relatively inconvenient in certain applications and may be more vulnerable to damage in other applications. Moreover, if more than one set of tracks is to be serviced, the short distance reduces the flexibility in enabling one feeder unit 10 to be used with several sets of tracks. Additionally, if a car has several outlets, the short conduit precludes connection to the several outlets without moving the rail car to successively bring each of the outlets into the correct position.

In accordance with the present invention, the length of the distance D, i.e., the effective length of the conduit 22, for example, can be greatly increased which vastly increases the flexibility of use of the feeder unit and therefore the entire conveying system in an area, by substantially minimizing, if not effectively eliminating the settling problem that may be experienced with dry particulate material.

In accordance with the present invention, substantially increased distances or lengths of the flexible conduit 22 can be achieved through the use of the injection of gaseous fluid into the particulate matter which aerates the same and enables it to flow in response to vacuum pressure being applied in the vessel 14 of the feeder unit 10 during the loading cycle. When the material is aerated during the load cycle, substantially increased lengths can be used, i.e., approaching or exceeding about 50 feet, for example, depending upon the characteristics of the specific material that is being moved. The aeration effectively unsettles the powdered particulate matter and enables it to be conveyed, even though the moving force is suction created through the application of vacuum pressure on the end of the conduit 22 near the feeder unit 10. While it may appear to be contradictory in supplying gaseous fluid (especially air) to the material which is being moved through the application of vacuum pressure, it has been found that the material will not settle and remain plugged when the gaseous fluid is applied to the interior of the conduit using the apparatus of the present invention.

Figure 2:
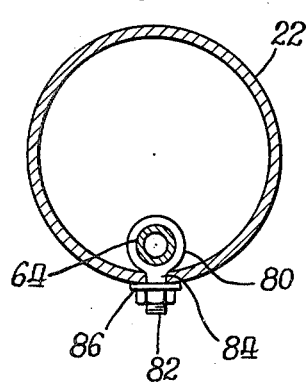
FIG. 2 is a cross section taken generally along the line 2—2 of FIG. 1 and illustrating the aeration means embodying the present invention located within the inlet conduit.
Figure 3:
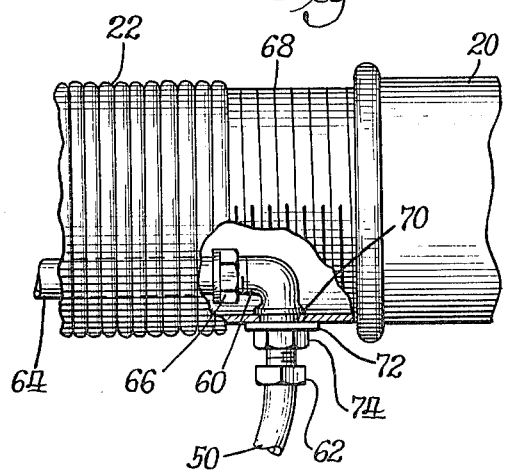
FIG. 3 is a detail of a portion of the apparatus shown in FIG. 1, particularly illustrating the aeration means extending to the interior of the conveying conduit.
Figure 4:
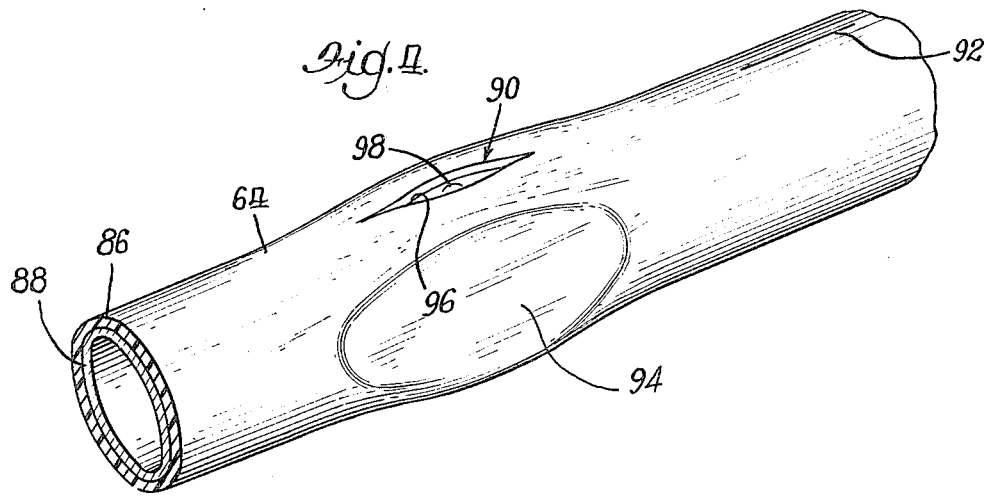
FIG. 4 is a perspective view of a short length of the aeration means, particularly illustrating the apertures for injecting gaseous fluid into the particulate material.

More particularly, and referring specifically to FIG. 1, a relatively small diameter hose or flexible conduit 50 is connected to a supply of positive gaseous fluid pressure through the fitting 52 which is connected to a source of gaseous fluid from a blower or the like. A solenoid valve 54 is provided and is controlled via an electric interconnection 56 from a control cabinet 58 associated with the feeder unit 10. During the load cycle when material is to be unloaded from the rail car and loaded into the vessel 14, the solenoid 54 is opened so that positive fluid pressure is applied to the interior of the flexible tubing 50 which extends to and terminates in an angled fitting 60 by a suitable connector 62. Aeration means 64 which is preferably in the shape of a flexible tubing is located in the interior of the conveying conduit 22 and injects the gaseous fluid into the material being conveyed within the conduit 22 also preferably terminates at the angled fitting 60 with a suitable connector 66. The fitting 60 penetrates a short length of conduit 68 that interconnects the conveying conduit 22 and elbow coupling 20. An aperture 70 in the conduit 68 is appropriately sized to receive the same and a washer 72 and a nut 74 securely holds the fitting 60 as well as effectively seals the aperture 70 so that the vacuum is not destroyed. The aeration tubing 64 extends along the bottom of the interior of the conduit 22 and into the conduit 42 as shown. Since the conduit 22 will be separated from the apparatus 26 at the connector 24, it is preferred that the tubing 64 exit the conduit 22 to the right of it as shown in FIG. 1, that it also exit the conduit 42 at the left of the connector 24 and that a separable connector 75 be provided in the tubing itself so that the conduit 22 can be moved to another pick-up point if desired. In this regard, each rail unloading apparatus should have its portion of tubing maintained in the conduit 42 and have the mating half of the connection for interconnecting with the other connector portion of the tubing 64 from the conduit 22. If the conduit 22 is to be connected to some other kind of equipment that has no continuing portion of aeration tubing, there should be a cap or other closure device placed on the portion of the connector 75 so that the fluid is injected into the interior of the conduit 22 rather than out the end of the connector 75. The portion of the aeration tubing 64 that is located in the interior of the conduit 22 is provided with a number of openings through which fluid can be injected into the particulate matter located within the conveying conduit 22. These openings are preferably constructed so that they are self-closing in the absence of positive pressure being applied and the particulate matter will therefore not enter the tubing 64 and create problems therewithin. It should also be appreciated that openings should not be present in the portion of the tubing 64 that is outside of the conduits 22 and 42 near the connector 24. Although the aeration tubing is preferably generally solid with openings along its length, it may be fabricated from a porous material such as cloth, metal screen or the like, that is preferably sufficiently tight to substantially preclude particles from penetrating into the center, and also sufficiently porous that the gaseous fluid can be forced through it at the fluid pressures contemplated, i.e., within the range of about 5 to about 45 psig. The end 76 of the tubing 64 is preferably capped or plugged by suitable means so that substantially all of the fluid that exits the tubing 64 along its length and thereby aerates the particulate material throughout the length of the tubing 64. As is shown in FIG. 2, the outside diameter of the tubing 64 is substantially smaller than the inside of the conduit 22 so that the effective area of the conduit 22 is not substantially reduced. In this regard, the outside diameter of the aeration tubing 64 is preferably within the range of about ½ inch to 1 inch.

The aeration tubing preferably extends downwardly to a location near the lowest elevation of the pan, which, as shown in FIG. 1, is approximately at the transition fitting 40. The gravity flow of the material from the rail car fills the boots 32 and pan 36 and the sloped bottom wall causes the material to move along toward the transition fitting 40. Fluid may also be injected into the boots 32 via tubing 78 that also originates at the solenoid valve 54. The aeration tubing 64 of the present invention preferably extends along the entire length of the conveying conduit 22 to the pan 36 and thereby aerates the material wherever vacuum pressure is the conveying force moving the material.

The aeration tubing 64 needs to be located in the bottom of the conduit 22 to insure reliable operation in that the gaseous fluid will rise throughout the material when it is injected into the lower portion of the conduit 22. To maintain the tubing 64 in the bottom of the conduit, a number of eyebolts 80, as shown in FIGS. 1 and 2, are provided. A threaded portion 82 of the bolts extend through apertures 84 in the conduit 22 and a washer shaped gasket 86 or the like effectively seals the conduit. The eye portion of the eyebolt is of a size compatible with the outside diameter of the tubing 64 which passes through it and effectively holds it a small distance from the inside surface of the conduit on the bottom of it. While the use of eyebolts provide a convenient means for maintaining the preferred position of the tubing 64 in the conduit, it should be appreciated that other suitable attachment means can be used. The tubing should be slightly spaced from the side wall so that the injection of the gaseous fluid does not create an abrasive jet that would damage the conduit 22, particularly when abrasive materials such as portland cement are being conveyed.

The aeration tubing 64 may comprise a single layer rubber or rubberlike hose or other flexible tubing, but preferably comprises a double layer tubing, i.e., having an outer layer 86 and inner layer 88, both layers of which are of neoprene or similar material. When the double layer tubing is utilized, the apertures or slits through which the gaseous fluid is injected into the material, such as representative apertures 90 and 92, can be made in a unique manner so that the slits will be self-closing when fluid pressure is not applied during operation. The number of slits present in the aeration tubing may vary but it is preferred that they be spaced no greater than 6 inches apart and no closer than about 1½ inches. They are also preferably located at least on opposite sides of the tubing.

To make the slits, the tubing may be squeezed or pinched as shown at 94 and the outer layer cut generally longitudinally for a distance of approximately at least about ¼ inch. When the slit is made while the tubing is compressed laterally, the outer layer 86 will separate as shown at 96 exposing the inner layer 88 and a drill can be used to cut a generally circular opening 98 in the inner layer 88. When the tubing is then relaxed, the outer layer 86 will close forming a slit as shown at 92 and will provide a barrier to the entry of particulate matter into the interior of the tubing 50. When positive pressure is applied to the interior of the tubing, the gaseous fluid will escape through the opening 98 and the slit in the outer layer 86 and will aerate the particulate matter located within the conduit 22.

The operation of the feeder unit 10, which requires intermittent application of the vacuum and positive air pressure, requires only that the aeration of the material be done within the conduit 22 during the loading cycle, i.e., during the application of vacuum pressure to the interior of the vessel 14. Thus, positive pressure is only applied to the tubing 64 by operation of the solenoid valve 54 during the loading cycle of the vessel 10.

From the foregoing, it should be appreciated that more reliable operation and flexible application of a pneumatic conveying system of the type which uses vacuum loading can be used and that the feeder unit 10 can be physically located away from the rail cars or containers that are being unloaded by greatly increased distances than has been heretofore possible. By using the apparatus of the present invention, a single feeder unit 10 can be used in conjunction with a number of railroad tracks, or a number of outlets on a single car, for example, as well as other equipment such as truck pans, storage silos and the like that may be located on the premises and it is only necessary to extend and connect the flexible conduit 22 to the particular rail car or the other equipment that is to be unloaded.

It should be understood that while preferred embodiments of the present invention have been described herein, various modifications, alternatives and substitutions will become apparent to those skilled in the art, and, accordingly, the scope of the present invention shall be defined only by the appended claims and equivalents thereof.

Various features of the present invention are set forth in the following claims.

What is claimed is:

1. Apparatus for pneumatically conveying generally dry particulate matter through a conveying conduit means from a first end portion to a second end portion, said conveying conduit means being flexible along a significant portion of the length thereof, said apparatus comprising:

means associated with said second end portion for intermittently and cyclically applying vacuum pressure to the interior of said conveying conduit means to create a suction force for moving said particulate matter toward the second end portion of the conveying conduit means;

flexible aeration conduit means having an outer dimension substantially smaller than the interior dimension of said conveying conduit means for introducing gaseous fluid under positive pressure into the particulate matter located therewithin, said flexible aeration conduit means having double-layer walls, the outer wall of which contains a plurality of closable slits located along the length thereof, the inner wall having an enlarged aperture underlying each of said slits;

means for attaching said flexible aeration conduit means to said conveying conduit means and comprising a number of eyebolts attached to the conveying conduit means with the aeration conduit means extending through the eye portion thereof, the eyebolts being adapted to hold said aeration conduit in spaced relation to the bottom interior wall of the conveying conduit;

means for controlling the supply of said gaseous fluid through said aeration conduit means and adapted to provide said positive pressure substantially only during the time in which vacuum pressure is applied to said conveying conduit means.

2. Apparatus for pneumatically conveying generally dry particulate matter through a conveying conduit means from a first end portion to a second end portion, said conduit means being of the type which is flexible along a significant portion of its length, comprising:

means associated with said second end portion for intermittently and cyclically applying vacuum pressure to the interior of said conveying conduit means to create a suction force for moving said particulate matter towards said second end portion of said conveying conduit means;

a flexible aeration conduit means located inside said conveying conduit means for introducing gaseous fluid under positive pressure into said particulate matter located therewithin;

said flexible aeration conduit means has an outer dimension substantially smaller than the interior dimension of said conveying conduit means; said flexible aeration conduit means has a plurality of closable apertures therein located along the length thereof;

holding means comprising eyebolt means attached to said conveying conduit means and holding said aeration conduit means generally along the bottom of said conveying conduit means, said aeration conduit means extending through the eye portion of said eyebolt means, said eyebolt means being spaced along the length of said conveying conduit means and adapted to hold said aeration conduit means in spaced relation to the bottom of said conveying conduit means;

means for controlling the supply of said gaseous fluid to said flexible aeration conduit means to provide said positive pressure gaseous fluid substantially only during the time vacuum pressure is applied to said conveying conduit means.

3. Apparatus as defined in claim 2 wherein said flexible aeration conduit means is comprised of a rubber-like material and said apertures comprise slits in the outer wall thereof which are separable to permit said gaseous fluid to pass therethrough in response to positive pressure being applied in the interior of said flexible aeration conduit means, said slits closing when said positive pressure is reduced to substantially preclude the flow of said particulate matter into the interior of said flexible conduit means.

4. Apparatus as defined in claim 3 wherein said flexible aeration conduit means has double-layer walls, the outer wall of which contains said slits, the inner wall of which has an enlarged aperture underlying each of said slits which remain open regardless of the pressure level therewithin.

5. Apparatus as defined in claim 2 wherein said flexible conduit means comprises a flexible neoprene hose, having inner and outer walls and a generally circular cross section.

6. Apparatus as defined in claim 2 wherein said controlling means comprises a solenoid valve interconnected between said conduit means and a supply of gaseous fluid at a predetermined positive pressure, said solenoid valve being operable to communicate said positive pressure gaseous fluid through said flexible aeration conduit means when said particulate matter is to be conveyed through said conveying means.

7. Apparatus as defined in claim 6 wherein said predetermined pressure is within the range of about 5 to about 45 psig.

8. Apparatus as defined in claim 2 wherein said flexible aeration conduit means extends substantially the length of said conveying means from said first end portion to said second end portion.

* * * * *